US010284655B2

(12) United States Patent
Weisman et al.

(10) Patent No.: US 10,284,655 B2
(45) Date of Patent: May 7, 2019

(54) RESOURCE ALLOCATION FOR CHANNEL ACCESS IN V2X COMMUNICATION SYSTEMS

(71) Applicant: GM GLOBAL TECHNOLOGY OPERATIONS LLC, Detroit, MI (US)

(72) Inventors: Olga Weisman, Rehovot (IL); Ayelet Aharon, Rishon Lezyon (IL); Tal Philosof, Givatayim (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 107 days.

(21) Appl. No.: 15/600,938

(22) Filed: May 22, 2017

(65) Prior Publication Data
US 2018/0338000 A1    Nov. 22, 2018

(51) Int. Cl.
*H04W 72/00*    (2009.01)
*H04L 29/08*    (2006.01)
*H04W 74/08*    (2009.01)

(52) U.S. Cl.
CPC ......... *H04L 67/12* (2013.01); *H04W 74/0833* (2013.01)

(58) Field of Classification Search
CPC ..... H04W 16/10; H04W 16/14; H04W 28/16; H04W 72/04; H04W 36/22
See application file for complete search history.

(56) References Cited

U.S. PATENT DOCUMENTS

| | | | |
|---|---|---|---|
| 10,019,904 B1* | 7/2018 | Chan | G08G 1/205 |
| 2008/0316052 A1* | 12/2008 | Ruffini | H04W 28/18 340/901 |
| 2013/0203427 A1* | 8/2013 | Hoyhtya | H04W 16/14 455/450 |
| 2016/0073298 A1* | 3/2016 | Brahmi | H04W 36/0072 455/436 |
| 2016/0173805 A1* | 6/2016 | Claus | H04N 17/004 348/148 |
| 2017/0231007 A1* | 8/2017 | Yang | H04W 74/0816 |
| 2017/0265214 A1* | 9/2017 | Hessler | H04B 7/0456 |
| 2018/0234898 A1* | 8/2018 | Kahtava | H04W 16/14 |
| 2018/0279388 A1* | 9/2018 | Miao | H04W 76/10 |

* cited by examiner

*Primary Examiner* — Shantell L Heiber
(74) *Attorney, Agent, or Firm* — Lorenz & Kopf, LLP

(57) ABSTRACT

A method in a vehicle configured to communicate in a vehicle point-to-multipoint communication system is provided. The method includes selecting a transmission resource comprising a sub-channel frequency range and time slot on which to compete for communication rights, competing with one or more vehicles for communication rights on the transmission resource using a listen-before-talk algorithm, and transmitting vehicle data on the transmission resource won.

A method in a communication system is provided. The method includes partitioning a vehicle travel pathway into a plurality of geographical bins, grouping the bins into one or more regions, mapping each bin in a region to a different transmission resource, preparing a data record containing the mapping of geographical bins to transmission resources, and providing the data record to one or more vehicles that travel down the travel pathway for identifying to the one or more vehicles the transmission resource on which to transmit data.

20 Claims, 11 Drawing Sheets

RESOURCE ALLOCATION FOR CHANNEL ACCESS IN V2X COMMUNICATION SYSTEMS

TECHNICAL FIELD

The technology described in this patent document relates generally to vehicle-to-vehicle communication and more particularly to resource allocation for channel access in a vehicle-to-vehicle (V2V) or vehicle-to-everything (V2X) communication system.

BACKGROUND

A vehicle-to-vehicle (V2V) communication system installed in a vehicle (e.g., automobile, car, light truck, and others) allows a vehicle to broadcast vehicle data, such as position, speed, windshield wiper activation, and other information, wirelessly to other vehicles in the vicinity. V2V systems may use dedicated short-range communications (DSRC) or cellular networks for V2V communications. DSRC involves direct communication between vehicles in an area, whereas a cellular network may allow two communication options: direct V2V communication (without using cellular base stations) and V2V communicating using cellular base stations. Cellular networks can also allow for communication with other devices such as smart signs, smart traffic lights, tolls, other parts of the transportation infrastructure, devices carried by pedestrians, and vehicle-to-everything (V2X) communications. V2V and V2X point-to-multipoint communication can enable a wide range of applications such as road safety (e.g., collision avoidance, merge assistance) and environmental monitoring (e.g., vehicle/people tracking).

In multi-user (multi-vehicle) communication, system performance is dictated at least in part by how resources are allocated to users. A communication system can use distributed resource allocation or centralized resource allocation for transmissions. Unwise allocation of system recourses (time and frequency) may result in interference (e.g., data collisions) between the users and degrade the performance of the system.

Accordingly, it is desirable to provide a system for more efficient point-to-multipoint communication through improved resource allocation. Furthermore, other desirable features and characteristics of the present invention will become apparent from the subsequent detailed description of the invention and the appended claims, taken in conjunction with the accompanying drawings and the background of the invention.

SUMMARY

A method in a vehicle configured to communicate in a vehicle point-to-multipoint communication system is provided. The method includes selecting a transmission resource on which to compete for communication rights wherein each transmission resource identifies one of a plurality of sub-channel frequency ranges and one of a plurality of transmission time-slots, competing with one or more vehicles for communication rights on the transmission resource using a listen before talk algorithm, and transmitting vehicle data on a transmission resource won during the competing.

A vehicle configured to communicate in a vehicle point-to-multipoint communication system is provided. The vehicle includes a point-to-multipoint communication controller configured to: select a transmission resource on which to compete for communication rights wherein each transmission resource identifies one of a plurality of sub-channel frequency ranges and one of a plurality of transmission time-slots, compete with one or more vehicles for the communication rights on the transmission resource using a listen before talk algorithm, and transmit vehicle data on a transmission resource on which the controller has won the communication rights.

A method in a vehicle point-to-multipoint communication system is provided. The method includes partitioning a vehicle travel pathway into a plurality of geographical bins wherein each bin is associated with a different geographical area on the travel pathway, grouping the bins into one or more regions, mapping each bin in a region to one of a plurality of transmission resources wherein each transmission resource identifies one of a plurality of sub-channel frequency ranges and one of a plurality of transmission time-slots, preparing a data record containing the mapping of bins to transmission resources, and providing the data record to one or more vehicles that travel down the travel pathway for identifying to the one or more vehicles the transmission resource to use to transmit data.

A method in a vehicle that communicates in a vehicle point-to-multipoint communication system is provided. The method includes receiving, at a vehicle, a data record containing a mapping of geographical bins to transmission resources wherein each transmission resource identifies one of a plurality of sub-channel frequency ranges and one of a plurality of transmission time-slots, and wherein each bin is associated with a different geographical area on a travel pathway, identifying the geographical bin in which the vehicle is located, and transmitting vehicle data using the transmission resource mapped to the geographical bin in which the vehicle is located.

A vehicle point-to-multipoint communication system is provided. The system includes a computer-implemented mapper configured to map a plurality of geographical bins to a plurality of transmission resources wherein each transmission resource identifies one of a plurality of sub-channel frequency ranges and one of a plurality of transmission time-slots, each bin is associated with a different geographical area on a travel pathway, and each bin in a region is mapped to a different one of the transmission resources. The computer-implemented mapper is further configured to prepare a data record containing the mapping of bins to transmission resources and provide the data record to one or more vehicles that travel down the travel pathway for identifying to the one or more vehicles the transmission resource to use to transmit data.

A vehicle is provided. The vehicle includes a controller configured to receive a data record containing a mapping of geographical bins to transmission resources wherein each transmission resource identifies one of a plurality of sub-channel frequency ranges and one of a plurality of transmission time-slots, and each bin is associated with a different geographical area on a travel pathway. The vehicle further includes a location system configured to identify the geographical bin in which the vehicle is located and a transmitter configured to transmit vehicle data using the transmission resource mapped to the geographical bin in which the vehicle is located.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following disclosure provides many different embodiments, or examples, for implementing different features of communication resource allocation in V2X communication systems. Example systems and methods for distributed resource allocation for transmission and geo based resource allocation for transmission are presented. The following detailed description is merely exemplary in nature and is not intended to limit the invention or the application and uses of the invention. Furthermore, there is no intention to be bound by any theory presented in the preceding background or the following detailed description.

Figure 1:
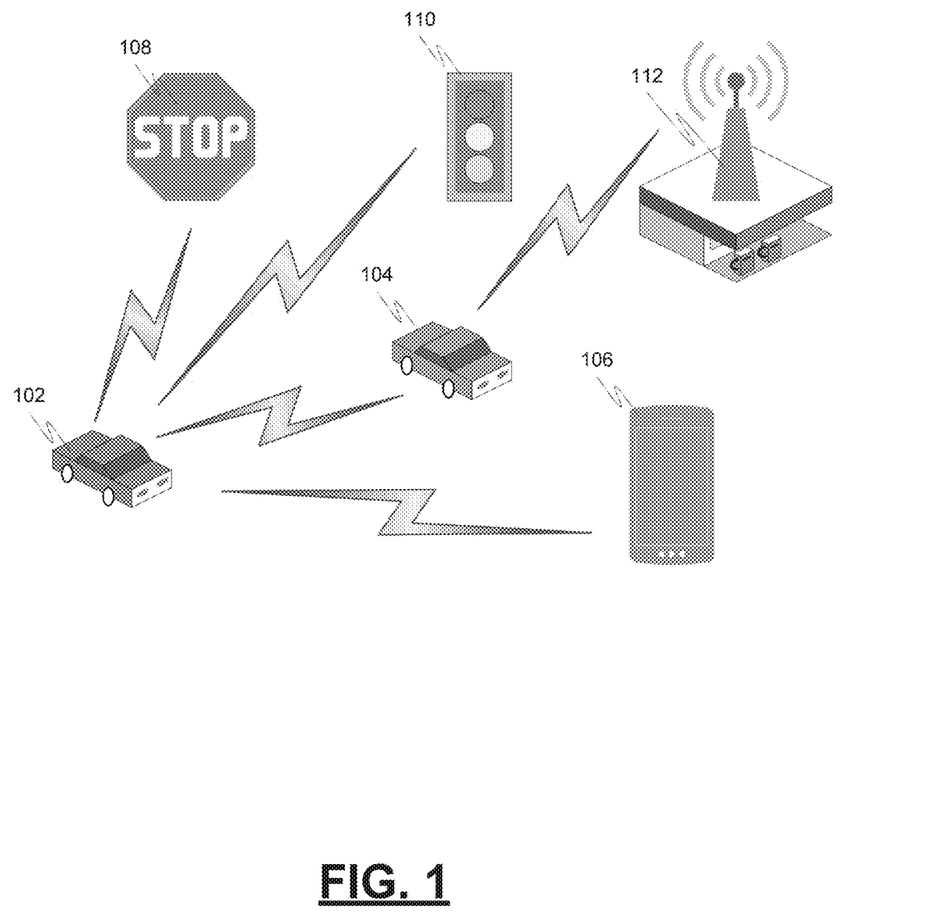
FIG. 1 is a diagram depicting a use case example for vehicle-to-vehicle (V2V) and/or vehicle-to-everything (V2X) communication, in accordance with some embodiments.

FIG. 1 is a diagram depicting a use case example for vehicle-to-vehicle (V2V) and/or vehicle-to-everything (V2X) point to multipoint communication. The communication system includes various communication entities such as a first vehicle 102 that can communicate with a second vehicle 104, a mobile device 106 carried by a pedestrian, a road-side sign 108, and a road-side traffic light 110. The various communication entities may communicate using Dedicated Short Range Communication (DSRC) and/or a cellular network, such as 4G LTE-V2X or 5G V2X in the future. When communicating using a cellular network, a cellular base station 112 may be used to facilitate communication or direct V2X communication (without base station) can be used as well. Described herein are systems and methods for scheduling transmissions between the various communication entities.

The frequency band used for communication in the example communication system 100 is divided into a plurality of contiguous sub-channels, while the time domain is divided into transmission intervals (time-slots). Users (i.e., the communication entities) communicate over a transmission resource which includes, at least, one of the fixed sub-channels during one fixed time slot. In some examples, a transmission resource may include an antenna space or another domain.

To reduce the likelihood of collisions and to mitigate interference between the various users, a multiple access method is employed. The multiple access method is employed by each user to obtain a transmission resource on which to transmit its data. A decentralized multiple listen before talk multiple access or a geo based multiple access method may be employed.

Figure 2:
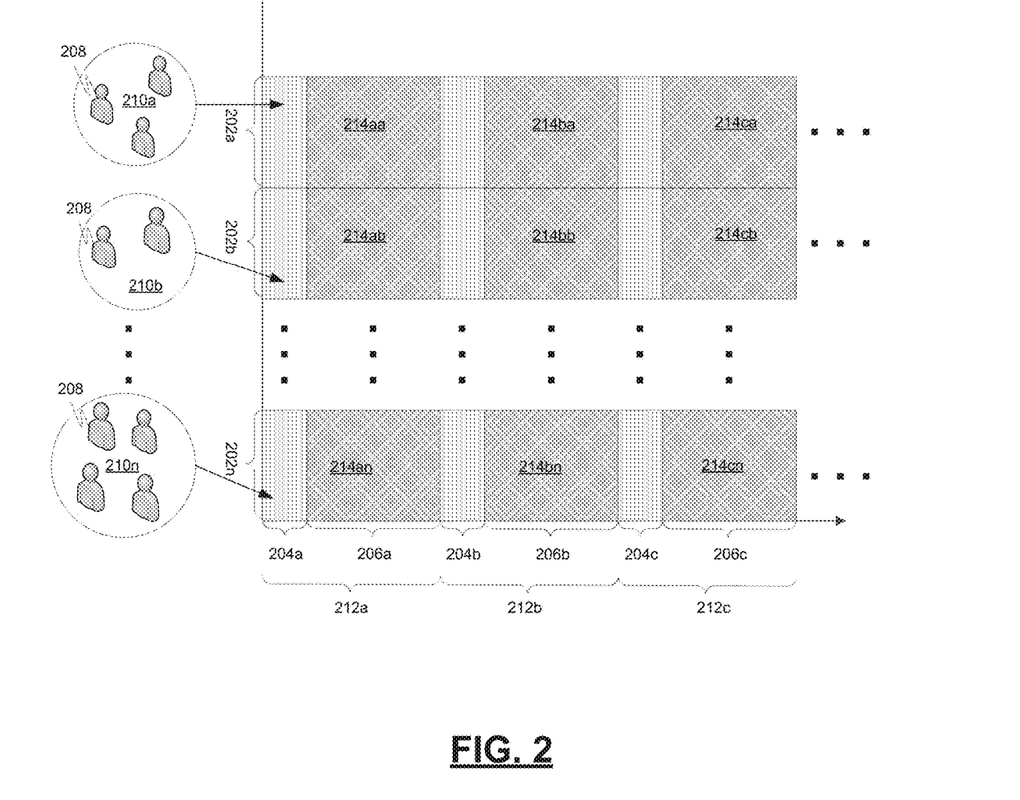
FIG. 2 is a diagram illustrating an example decentralized multiple listen before talk multiple access method for providing user access to a communication channel for V2V and/or V2X communication, in accordance with some embodiments.

FIG. 2 is a diagram illustrating an example decentralized multiple listen before talk multiple access method for providing user access to a communication channel for V2V and/or V2X communication. Depicted in FIG. 2 are example transmission resources (214aa-214cn) that have been plotted with an x-axis representing the time domain and the y-axis representing the frequency domain. A frequency band has been subdivided into a plurality of sub-channels (202a-202n) of different frequency ranges and the time domain has been subdivided into transmission intervals (time slots 212a-212c). Each transmission resource, in this example, has a contention time resource (204a, 204b, or 204c) and a data transmission time resource (206a, 206b, or 206c). During the contention time resource (204a, 204b, or 204c), potential users may compete for access to one or more transmission resources (214aa-214cn). During the data transmission time resource (206a, 206b, or 206c), the winning users may transmit on the sub-channel for the transmission interval, i.e., transmission resource, on which the user won the right to transmit.

Potential users 208 are grouped into one or more user groups 210a, 210b, . . . , 210n. The users 208 compete with other users in its user group for communication rights. Each user group 210a, 210b, . . . , 210n is mapped to one set of the transmission resources (214aa-214cn) or sub-channel (202a, 202b, . . . , 202n). For example, user group 210a is mapped to transmission resources (214aa, 214ba, 214ca, . . . ) or sub-channel (202a), user group 210b is mapped to transmission resources (214ab, 214bb, 214cb, . . . ) or sub-channel (202b), and user group 210n is mapped to transmission resources (214an, 214bn, 214cn, . . . ) or sub-channel (202n). The winning user from each group is permitted to transmit over one of the transmission resources (214aa-214cn) mapped to or associated with its user group 210a, 210b, . . . , 210n.

Figure 3:
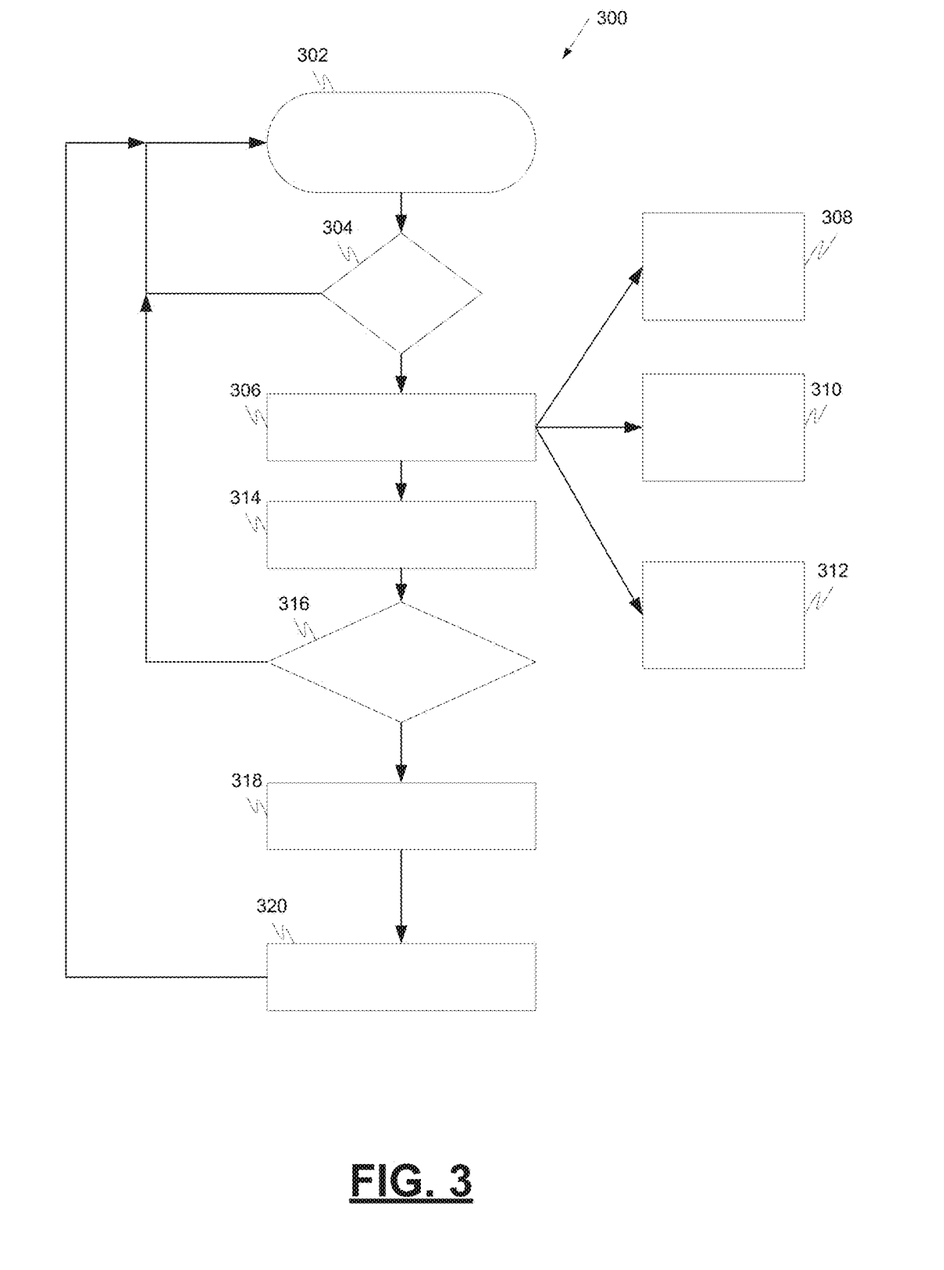
FIG. 3 is a process flow chart depicting an example decentralized multiple listen before talk multiple access process for providing user access to a communication channel for V2V and/or V2X communication, in accordance with some embodiments.

FIG. 3 is a process flow chart depicting an example decentralized multiple listen before talk multiple access process 300 for providing user access to a communication channel for V2V and/or V2X communication. The process is initiated each transmission interval. Each user determines whether it has data to transmit (decision 304). If a user determines that it does not have data to transmit (no at decision 304), the user reinitiates the process 300 at the next transmission interval (operation 302). If the user determines that it does have data to transmit (yes at decision 304), then the user selects one or more transmission resources at the next time interval on which to attempt to transmit its data (operation 306).

There are a number of options available for selecting the one or more transmission resources. In one example, a transmission resource may be randomly selected (operation 308). In another example, a plurality of transmission resources may be randomly selected (operation 310). When one of the plurality of randomly selected transmission resources becomes available for transmission, data transmission will occur over that transmission resource. In another example, a transmission resource may be selected based on the geo-location of the user (operation 312). A centralized system may map a plurality of small geographical areas to transmission resources wherein each geographical area is mapped to one transmission resource. A user would choose the transmission resource that is mapped to the geographical area in which the user is located when the transmission resource selection is made. Other transmission resource selection methods may be used in other examples.

After transmission resource selection, the user(s) listen to the selected transmission resource(s) (operation 314) to determine if a selected transmission resource is available for transmission. The user(s), based on listening to the transmission resource(s), determines if a transmission resource is available for transmission (decision 316). If a transmission resource is not free (no at decision 316), the user(s) initiates the process 300 again at the next transmission interval. If a transmission resource is free (yes at decision 316), the user selects one of the available transmission resources (if more than one are available) for transmission (operation 318) at the time interval. After selecting a transmission resource for transmission, the user may transmit on the selected transmission resource (operation 320). After transmitting, the user initiates the process 300 again at the next transmission interval.

Figure 4:
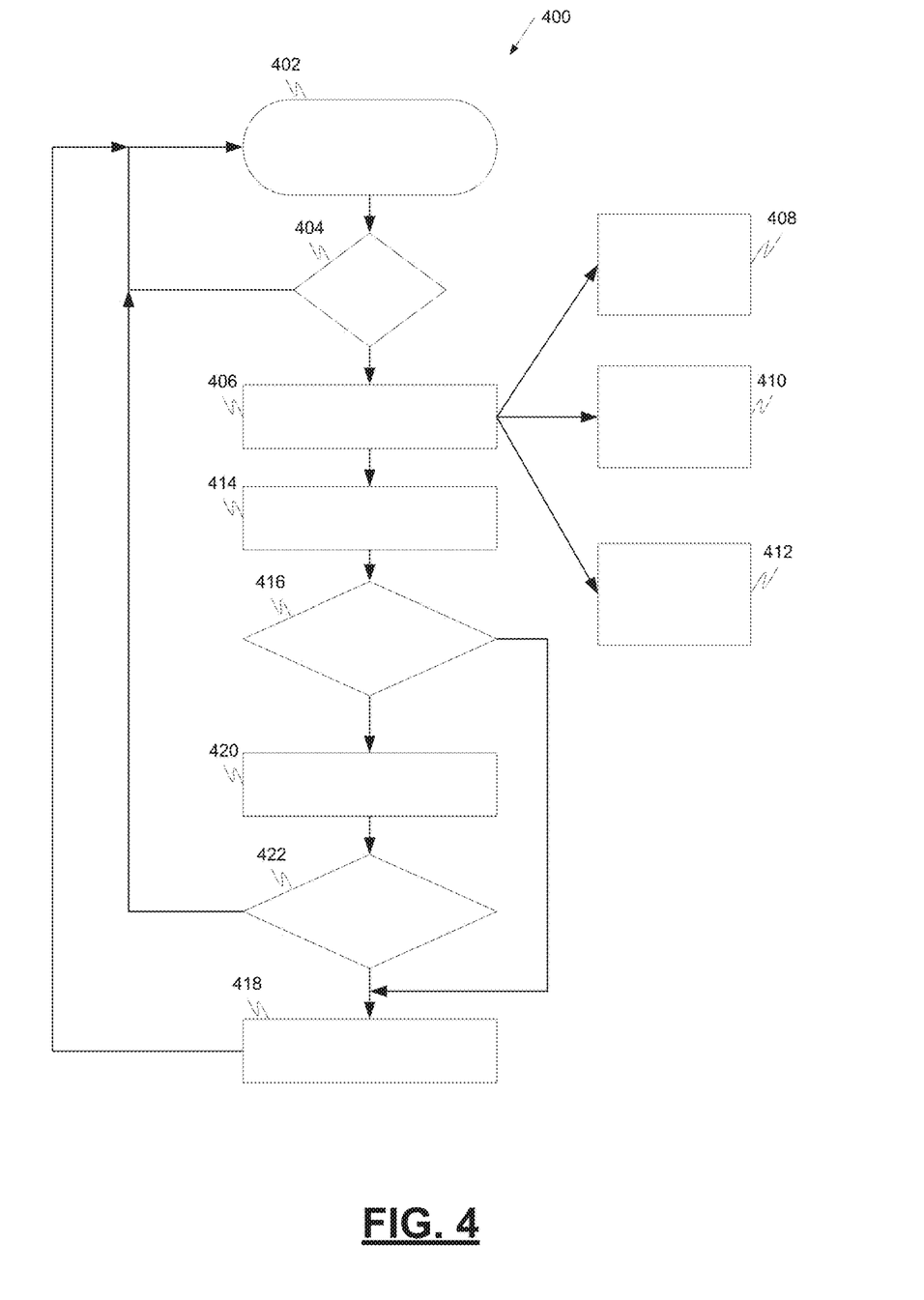
FIG. 4 is a process flow chart depicting another example decentralized multiple listen before talk multiple access process for providing user access to a communication channel for V2V and/or V2X communication, in accordance with some embodiments.

FIG. 4 is a process flow chart depicting another example decentralized multiple listen before talk multiple access process 400 for providing user access to a communication channel for V2V and/or V2X communication. The process is initiated each transmission interval (operation 402). Each user determines whether it has data to transmit (decision 404). If a user determines that it does not have data to transmit (no at decision 404), the user reinitiates the process 400 at the next transmission interval. If the user determines that it does have data to transmit (yes at decision 404), then the user selects one or more transmission resources at the next time interval on which to attempt to transmit its data (operation 406).

There are a number of options available for selecting the one or more transmission resources. In one example, a transmission resource may be randomly selected (operation 408). In another example, a plurality of transmission resources may be randomly selected (operation 410). When one of the plurality of randomly selected transmission resources becomes available for transmission, data transmission will occur over that transmission resource. In another example, a transmission resource may be selected based on the geo-location of the user (operation 412). A centralized system may map a plurality of small geographical areas to transmission resources wherein each geographical area is mapped to one transmission resource. A user would choose the transmission resource that is mapped to the geographical area in which the user is located when the transmission resource selection is made. Other transmission resource selection methods may be used in other examples.

After transmission resource selection, the user(s) listens to the selected transmission resource(s) (operation 414) to determine if a selected transmission resource(s) is free from transmission (decision 416). If a user determines that a transmission resource is free from transmission (yes at decision 416), the user may transmit its data on the clear transmission resource (operation 418) at the time interval. If a user determines that a transmission resource is not free from transmission (no at decision 416), the user competes with other users for the right to transmit on the transmission resource(s) (operation 420). A user determines if it has won a competition for the right to transmit on a transmission resource (decision 422). If a user does not win the competition for the right to transmit on a transmission resource (no at decision 422), the user reinitiates the process 400 at the next transmission interval. If a user does win the competition for the right to transmit on a transmission resource (yes at decision 422), the user may transmit its data on the winning transmission resource (operation 418). After transmitting, the user initiates the process 400 again at the next transmission interval.

Figure 5:
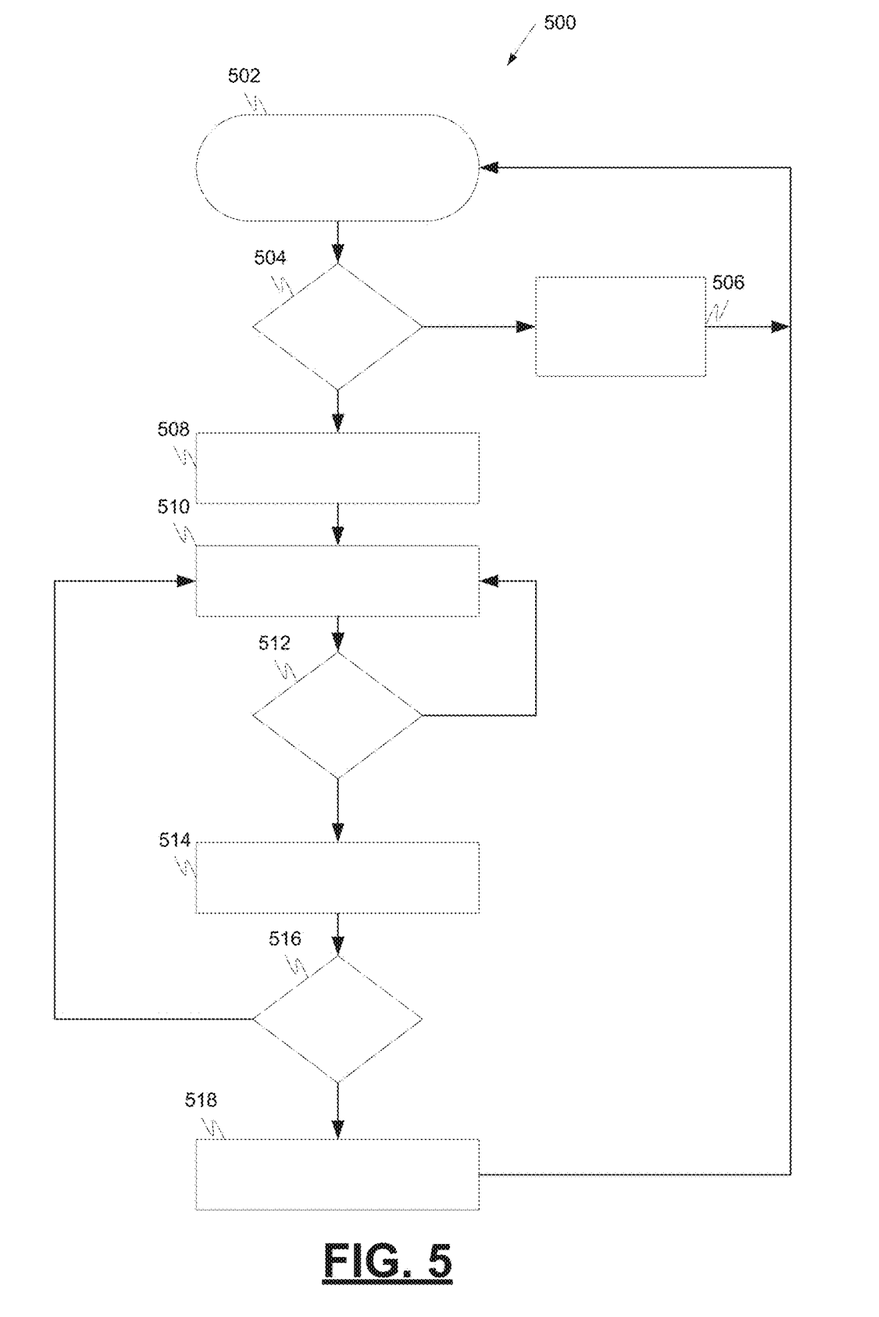
FIG. 5 is a process flow chart depicting an example decentralized multiple listen before talk multiple access process for determining how users compete for the right to transmit on a transmission resource, in accordance with some embodiments.

FIG. 5 is a process flow chart depicting an example decentralized multiple listen before talk multiple access process 500 for determining how users compete for the right to transmit on a transmission resource in the next time interval. After a user determines that it does have data to transmit (operation 502) and selects one or more transmission resource on which to attempt to transmit its data using one of the number of available options for selecting a transmission resource, the user(s) listens to the selected transmission resource(s) and determines if a selected transmission resource(s) is free from transmission (decision 504). If a user determines that a transmission resource is free from transmission (yes at decision 504), the user may transmit its data on the clear transmission resource (operation 506). After transmitting, the user may initiate the process 500 again if it has more data to transmit.

If a user determines that a transmission resource is not free from transmission (no at decision 504), the user selects a random count (operation 508). The random count value in this example is an integer between 1 and N. The integer N may be a fixed value all users use or may be a value dynamically assigned by a network device for a geographical area.

After selecting a random count value, the user waits for a sensing period (operation 510). After the sensing period, the user checks and determines if the transmission resource is transmission free (decision 512). If the user determines that the transmission resource is not transmission free (no to decision 512), the user continues the process by waiting for another sensing period (operation 510). If the user determines that the transmission resource is transmission free (yes to decision 512), the user decrements the randomly drawn count by one (operation 514). The user then determines if the count is equal to zero (decision 516). If the count is not equal to zero (no at decision 516), the user continues the process by waiting for another sensing period (operation 510). If the count is equal to zero (yes at decision 516), the user has won the right to transmit and may transmit (operation 518). After transmitting, the user may initiate the process 500 again if it has more data to transmit. The portion of process 500 from operations 510 to operation 518, results in the user waiting for the number of transmission free sensing periods equal to its randomly drawn count before transmitting on the transmission resource.

In another example, a vehicle includes a point to multipoint communication controller comprising one or more processors and configured by computer programming instructions to select a transmission resource on which to compete for communication rights, compete with one or more vehicles for the communication rights on the transmission resource using a listen before talk algorithm, and transmit vehicle data on a transmission resource on which the controller has won the communication rights.

The foregoing provided examples of distributive or decentralized techniques for providing one or more users with access to a transmission resource for transmitting its data. In these examples, the users may be segmented into one or more user groups that compete for the right to transmit on transmission resources associated with the user group. The users listen for a clear transmission resource before attempting to transmit on a transmission resource. In one example, if a transmission resource is not initially clear, the users wait for different, randomly-chosen, periods of time for the transmission resource to become clear. The user with the shortest wait period in this example wins the right to transmit first and may transmit once its wait period has expired.

In one embodiment, a method in a vehicle configured to communicate in a vehicle point-to-multipoint communication system is provided. The method comprises selecting a transmission resource on which to compete for communication rights wherein each transmission resource identifies one of a plurality of sub-channel frequency ranges and one of a plurality of transmission time-slots, competing with one or more vehicles for communication rights on the transmission resource using a listen before talk algorithm, and transmitting vehicle data on a transmission resource won during the competing.

These aspects and other embodiments may include one or more of the following features. Selecting a transmission resource may comprise randomly selecting a transmission resource on which to compete for communication rights. Selecting a transmission resource may comprise randomly selecting a plurality of transmission resources on which to compete for communication rights. Transmitting vehicle data may comprise winning communication rights over at least one of the randomly selected transmission resources and transmitting vehicle data over one of the at least one winning transmission resource. A geographical region in which the vehicle is located may be mapped to a specific transmission resource and selecting a transmission resource may comprise selecting the transmission resource that is mapped to the geographical region in which the vehicle is located. Competing and transmitting may comprise waiting for a transmission-free sensing period and transmitting vehicle data if the transmission resource is transmission-free for the sensing period. The sensing period may comprise a number of transmission-free sensing intervals equal to a random count that is randomly chosen. The random count may be an integer between one and N, wherein N is provided by network infrastructure. Waiting may comprise not counting a sensing period if a transmission occurs after the non-counted sensing period but before the next sensing period. The method may further comprise listening to the transmission resource to determine if the transmission resource is free from transmissions prior to beginning the sensing period and transmitting vehicle data if the transmission resource is free from transmissions prior to beginning the sensing period.

In another embodiment, a vehicle configured to communicate in a vehicle point-to-multipoint communication system is provided. The vehicle comprises a point-to-multipoint communication controller configured to select a transmission resource on which to compete for communication rights wherein each transmission resource identifies one of a plurality of sub-channel frequency ranges and one of a plurality of transmission time-slots, compete with one or more vehicles for the communication rights on the transmission resource using a listen before talk algorithm, and transmit vehicle data on a transmission resource on which the controller has won the communication rights.

These aspects and other embodiments may include one or more of the following features. The point-to-multipoint communication controller may be further configured to randomly select the transmission resource on which to compete for communication rights. The point-to-multipoint communication controller may be further configured to randomly select a plurality of transmission resources on which to compete for communication rights. The point-to-multipoint communication controller may be further configured to transmit the vehicle data over one transmission resource on which the controller has won the communication rights. A geographical region in which the vehicle is located may have been mapped to a specific transmission resource and the point-to-multipoint communication controller may be further configured to select a transmission resource(s) that is mapped to the geographical region in which the vehicle is located. The point-to-multipoint communication controller may be further configured to wait for a transmission-free sensing period and transmit vehicle data if the transmission resource is transmission-free for the sensing period. The sensing period may comprise a consecutive number of transmission-free sensing periods equal to a random count that is randomly chosen. The random count may be a number between zero and N, wherein N is predefined or provided by network infrastructure. The point-to-multipoint communication controller may be further configured to not count a sensing period if a transmission occurs after the non-counted sensing period but before the next sensing period. The point-to-multipoint communication controller may be further configured to listen to the transmission resource to determine if the transmission resource is free from transmissions prior to beginning the sensing period and transmit vehicle data if the transmission resource is free from transmissions prior to beginning the sensing period.

Example systems and methods for geo-based resource allocation for transmission are presented next. A travel pathway for a vehicle is subdivided into bins. Each bin is mapped to a transmission resource. When a user is ready to transmit its data, it transmits its data using the transmission resource assigned to the bin in which the user is located. The user may transmit data without having to compete with other users for the right to transmit.

Figure 6:
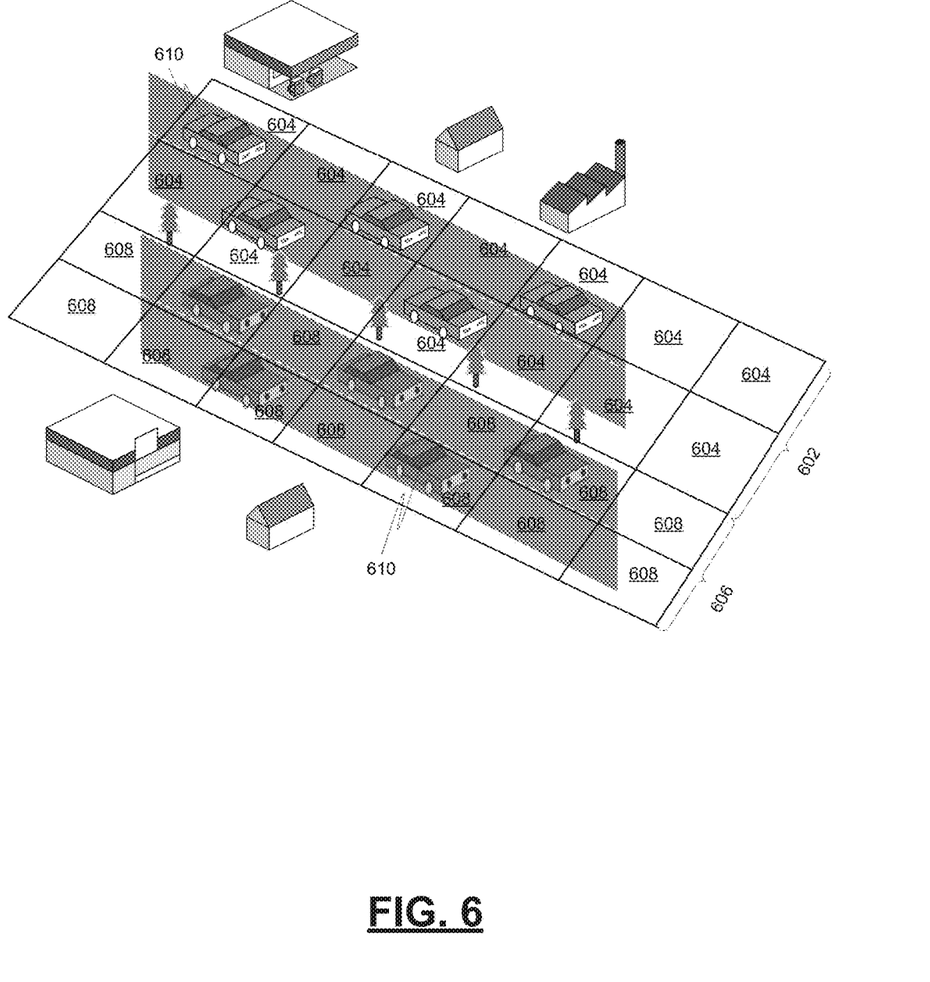
FIG. 6 is a block diagram illustrating an example geo based method for providing user access to a communication channel, in accordance with some embodiments.

FIG. 6 is a diagram illustrating an example geo-based method for providing user access to a communication channel. A first example vehicle pathway 602 is partitioned or subdivided into a plurality of first pathway geographical bins 604 and a second example vehicle pathway 606 is partitioned or subdivided into a plurality of second pathway geographical bins 608. Each bin 604, 608, in this example, has an approximately rectangular shape or other shape. Each first pathway bin 604 and second pathway bin 606 occupies a geographical area and is mapped by network infrastructure, such as a computer-implemented mapper that executes computer programming instructions, to a transmission resource. A transmission resource may comprise a frequency domain component (e.g., sub-channel frequency range), a time domain component (e.g., a time interval in a transmission cycle), a spatial component (e.g., antenna spatial feature), and/or some other domain. Each vehicle 610 transmits its data using the transmission resource received from the "mapper" that corresponds to the vehicle's location, which the vehicle can determine from a location system such as a GPS-enabled vehicle location system or other position system. Thus, a vehicle may be provided a transmission resource on which to transmit its data based on its position within the partitioned vehicle pathway.

If the number of bins in a geographical area is less than or equal to the number of transmission resources, then each bin can be assigned a unique transmission resource to allow non-interfering transmissions. If the number of bins is greater than the number of transmission resources in a geographical area, then a wraparound interval may be defined to space apart bins that allow transmissions using the same transmission resource. The wraparound interval (or the interval of repetition) is the number of bins apart two bins must be that allow transmissions using the same transmission resource in parallel for minimal cross interferences. The wraparound interval can be several bins or more.

Figure 7:
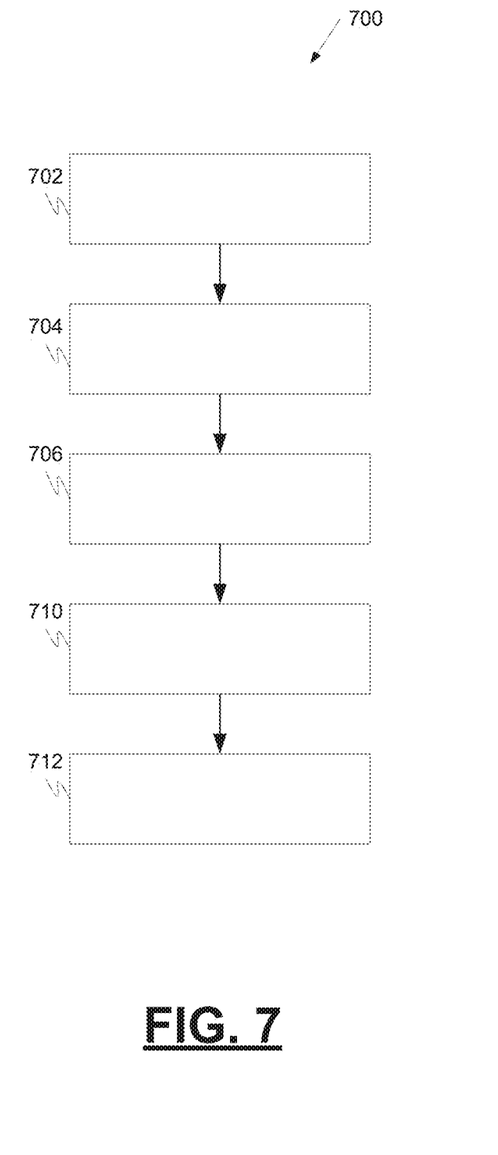
FIG. 7 is a process flow chart depicting an example process in network infrastructure for providing user access to a communication channel, in accordance with some embodiments.

FIG. 7 is a process flow chart depicting an example process 700 in network infrastructure for providing user access to a communication resources. A vehicle travel pathway, such as a street, road, highway, etc., is partitioned into a plurality of geographical bins (operation 702) wherein each bin is associated with a different geographical area on the travel pathway. In one example, each bin is sized for one vehicle or more occupying the bin at a time. In another example, the shape of each bin is rectangular. The bins are grouped into one or more regions (operation 704). In one example, the number of bins in a region is less than or equal to the number of transmission resources in the region.

Each bin in a region is mapped to one of the transmission resources in the region (operation 706). If the number of bins in the region is less than or equal to the number of transmission resources, then each bin in a region may be mapped to a unique transmission resource. If the number of bins in the region is greater than the number of transmission resources in the region, a wraparound interval may be used between bins that share the same transmission resource.

A data record containing the mappings is prepared (operation 710). The data record is provided to one or more vehicles that travel down the travel pathway (operation 712) via cellular link or other communication link. The data record identifies to the vehicles the exact transmission resource to use to transmit data. A vehicle may use its location system such as a GPS-enabled location system to determine that it has entered a specific bin and transmit using the transmission resource assigned to the specific bin.

Figure 8:
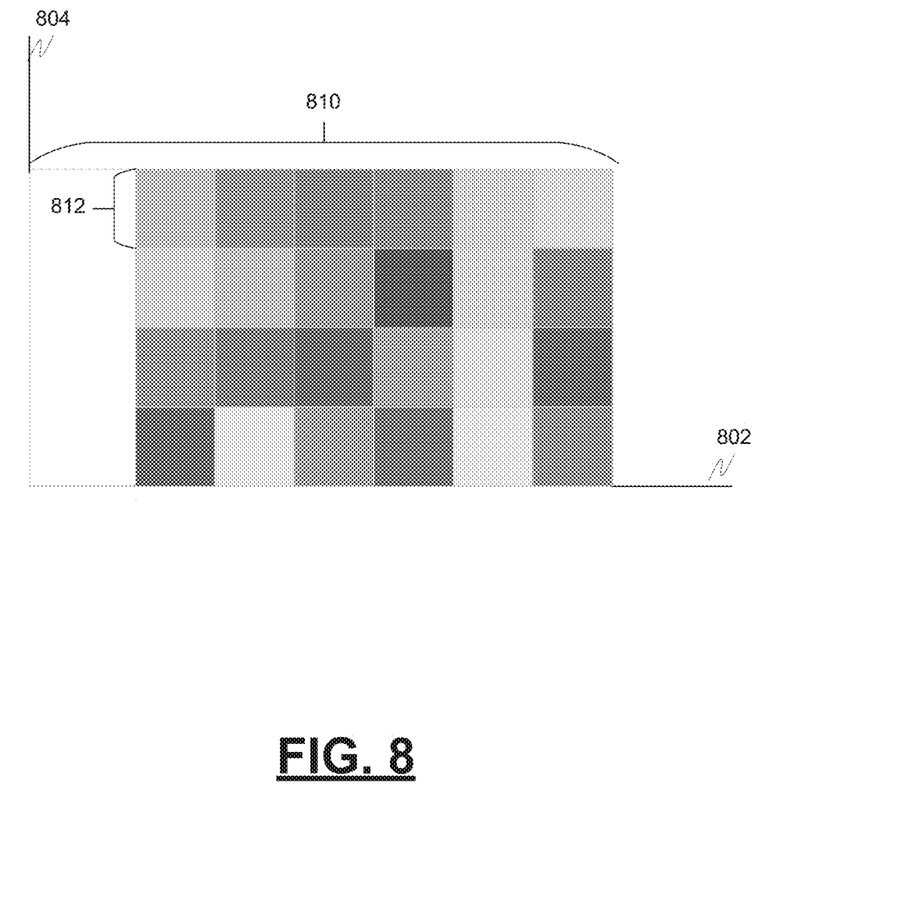
FIG. 8 is a block diagram illustrating an example geo based mapping of a communication channel in the time and frequency domains, in accordance with some embodiments.

FIG. 8 illustrates a mapping example of transmission resources 810 in the time and frequency domains. In this specific example, the x-axis 802 represents the time domain and the y-axis 804 represents the frequency domain (other domains can be utilized, e.g., the spatial domain). The transmission resource 810 may include a control transmission and data transmission. Each time slot is divided into sub-channels in the frequency domain to form transmission resources 812. Each transmission resource, in this example, is associated with a specific sub-channel and time-slot. A transmission resource can be assigned to a vehicle based on the vehicle's position in a bin. A mapping table may be provided by a centralized system that provides via communication link to a vehicle the mapping between a bin and transmission resource.

Figure 9:
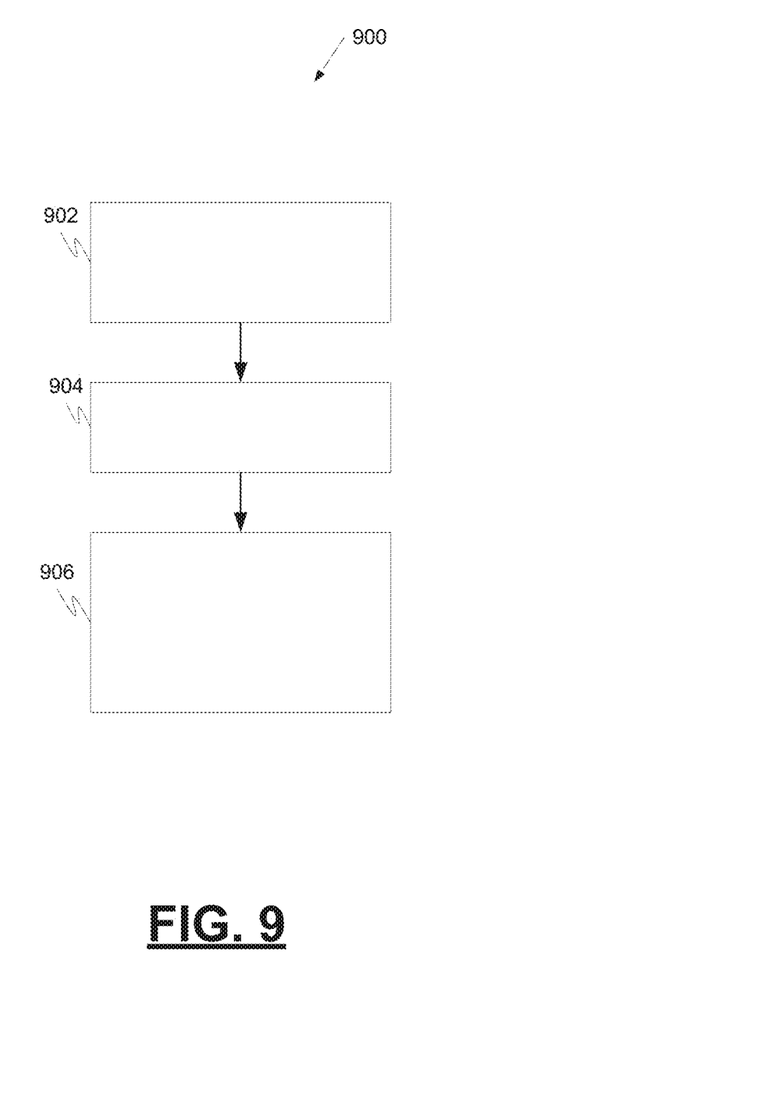
FIG. 9 is a process flow chart depicting an example geo based process in a vehicle for accessing a communication channel, in accordance with some embodiments.

FIG. 9 is a process flow chart depicting an example process 900 in a vehicle for accessing a transmission resource. The vehicle receives a data record via communication link from a web server containing a mapping of geographical bins to transmission resources (operation 902) wherein each bin is associated with a different geographical area on a travel pathway. The vehicle identifies the geographical bin in which the vehicle is located (operation 904), for example, using a vehicle location system such as a GPS enabled system. The vehicle may transmit its vehicle data on the transmission resource mapped to the geographical bin in which the vehicle is located.

Figure 10A:
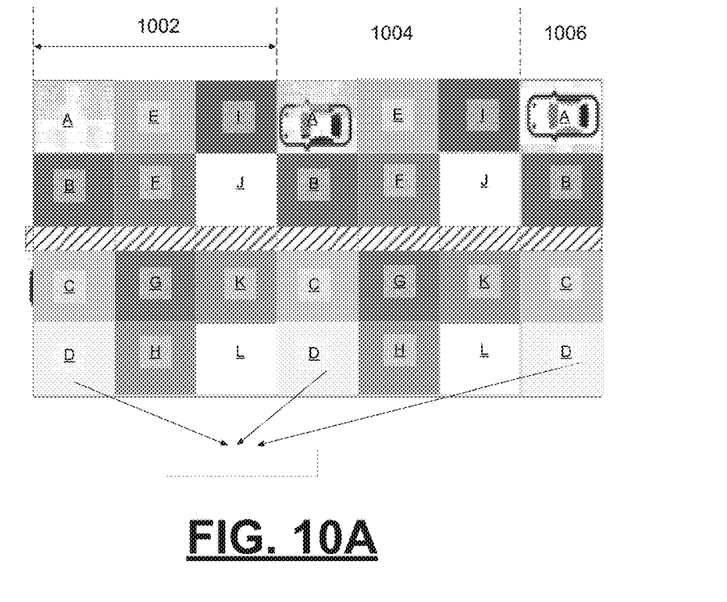
FIG. 10A is a diagram depicting example geo based method uses of wraparound intervals on a straight road segment, in accordance with some embodiments.
Figure 10B:
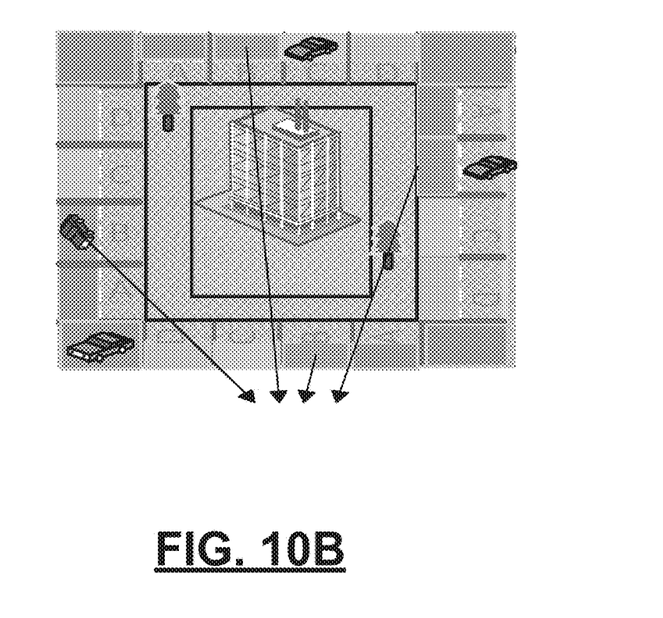
FIG. 10B is a diagram depicting example geo based method uses of wraparound intervals on a city block, in accordance with some embodiments.

FIG. 10A is a block diagram depicting an example use of wraparound intervals on a straight road segment. FIG. 10B is a block diagram depicting an example use of wraparound intervals on a city block. In each example, the bins mapped to the same transmission resource are spaced apart by the wraparound interval to minimize interference during parallel transmission.

Depicted in FIG. 10A is a straight road segment that has been partitioned into a plurality of geographical bins. The road segment is also subdivided into three base regions 1002, 1004, 1006. Each base region has bins that are each mapped to a unique transmission resource. As an example, base region 1002 has bins A-L that are mapped to unique transmission resources within the region and base region 1004 also has bins A-L that are mapped to unique transmission resources within the region. The two regions 1002, 1004 each has a bin that is mapped to the same transmission resource as a bin in the other region. The bins sharing the same transmission resource, however, are separated by a wraparound interval to allow parallel transmissions with minimized interference.

Similarly, a city region, depicted in FIG. 10B, containing a plurality of city blocks has been partitioned into a plurality of geographical bins. Each city block has bins that are each mapped to a unique transmission resource. As an example, each city block has bins A, B, C, D that are mapped to unique transmission resources within the region. Each city block has a bin that is mapped to the same transmission resource as a bin in another city block. The bins sharing the same transmission resource, however, are separated by a wraparound interval to allow parallel transmissions with minimized interference.

Because of the distance between bins allowing parallel transmissions, a vehicle receiving the parallel transmissions may receive a signal containing the combined parallel transmission but with the transmissions at different signal levels. The receiving vehicle may be able to retrieve the various signals by retrieving the transmissions one at a time from the received signal using a successive interference cancellation (SIC) decoder.

Figure 11:
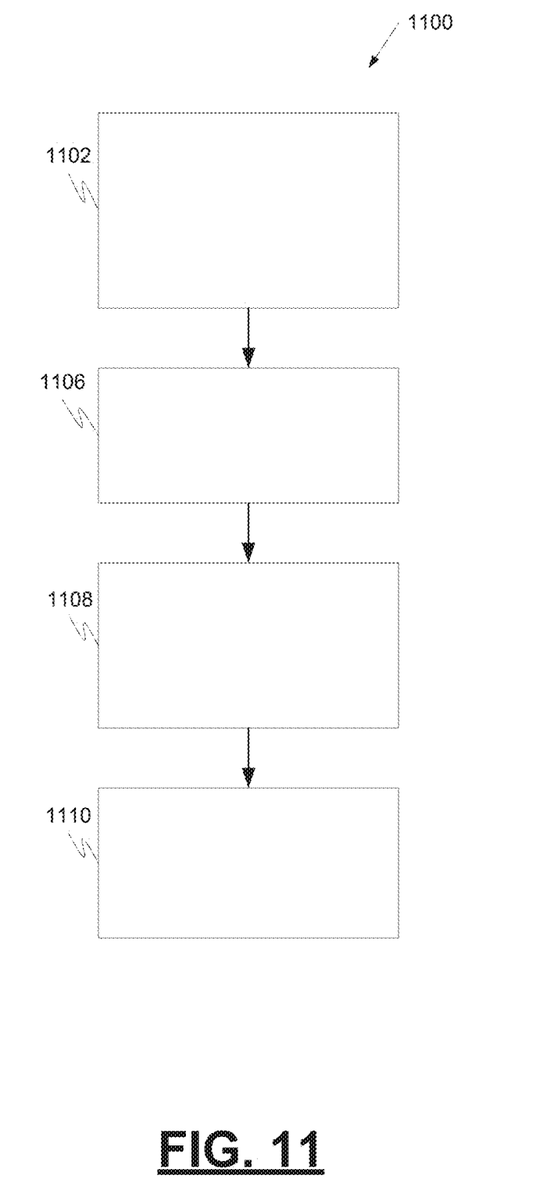
FIG. 11 is a process flow chart depicting an example geo based process in a vehicle for retrieving parallel transmissions from a communication channel, in accordance with some embodiments.

FIG. 11 is a process flow chart depicting an example process 1100 in a vehicle for decoding parallel transmissions from a communication channel. The vehicle receives a signal on a first transmission resource that contains vehicle data from a plurality of vehicles (operation 1102). The vehicle decodes first vehicle data transmitted by a first vehicle from the received signal (operation 1106). The vehicle subtracts the first vehicle estimated received signal from the received signal to generate first leftover signal (operation 1108). The vehicle decodes second vehicle data transmitted by a second vehicle from the first leftover signal (operation 1110). The vehicle can subtract the second vehicle estimated received signal from the first leftover signal and generate second leftover signal and then decodes third vehicle data from the second leftover signal. This sequence of decoding vehicle data and then subtracting the vehicle estimated received signal from the received signal may be repeated until all the vehicle data have been decoded. This process may be helpful when wraparound intervals are used or when more than one vehicles are located at the same bin.

In one example, the vehicle includes a successive interference cancellation decoder to decode the vehicles data, decodes first vehicle data from the received signal, subtract the first vehicle estimated receive signal from the received signal leaving first leftover signal, and decodes second vehicle data transmitted by a second vehicle from the first leftover signal. The successive interference cancellation decoder may be implemented by one of the plurality of processor-implemented controllers in the vehicle executing computer programming instructions.

The foregoing provided examples of centralized preprocessing for providing one or more vehicles with access to a transmission resource for transmitting its data. In these examples, a vehicle pathway is segmented into geographical bins. A vehicle receives a mapping of geographical bins to transmission resources. The vehicle transmits over the transmission resource associated with the geographical bin in which the vehicle is located.

In one embodiment, a method in a vehicle point-to-multipoint communication system is provided. The method comprises partitioning a vehicle travel pathway into a plurality of geographical bins wherein each bin is associated with a different geographical area on the travel pathway, grouping the bins into one or more regions, mapping each bin in a region to one of a plurality of transmission resources wherein each transmission resource identifies one of a plurality of sub-channel frequency ranges and one of a plurality of transmission time-slots, preparing a data record containing the mapping of geographical bins to transmission resources, and providing the data record to one or more vehicles that travel down the travel pathway for identifying to the one or more vehicles the transmission resource to use to transmit data.

These aspects and other embodiments may include one or more of the following features. The number of bins in a region may be less than or equal to the number of transmission resources. Mapping each bin may comprise mapping each bin in a region to a different one of the transmission resources. Grouping the bins may comprise grouping the bins into at least a first base region and a second base region wherein the number of bins in each base region is less than or equal to the number of transmission resources and, for each bin in the first base region, there may be a corresponding bin in the second base region that is mapped to the same transmission resource as the bin in the first base region and the corresponding bin in the second base region is spaced several bins away from the bin in the first base region. The number of bins in a region may be greater than the number of transmission resources and mapping each bin may comprise mapping two bins that are separated by a predetermined distance to the same transmission resource.

In another embodiment, a method in a vehicle that communicates in a vehicle point-to-multipoint communication system is provided. The method comprises receiving, at the vehicle, a data record containing a mapping of geographical bins to transmission resources wherein each transmission resource identifies one of a plurality of sub-channel frequency ranges and one of a plurality of transmission time-slots and wherein each bin is associated with a different geographical area on a travel pathway, identifying the geographical bin in which the vehicle is located, and transmitting vehicle data using the transmission resource mapped to the geographical bin in which the vehicle is located.

These aspects and other embodiments may include one or more of the following features. The method may further comprise receiving a signal on a first transmission resource that contains vehicle data from a single vehicle. The method may further comprise receiving a signal on a first transmission resource that contains vehicle data from a plurality of vehicles. The method may further comprise decoding first vehicle data transmitted by a first vehicle from the received signal, subtracting the first vehicle estimated received signal from the received signal leaving a first leftover signal, and decoding second vehicle data transmitted by a second vehicle from the first leftover signal. Receiving a data record may comprise receiving a data record via a communication link from a web server.

In another embodiment, a vehicle point-to-multipoint communication system is provided. The system comprises a computer-implemented mapper configured to map a plurality of geographical bins to a plurality of transmission resources wherein each bin is associated with a different geographical area on a travel pathway, each bin in a region is mapped to a different one of the transmission resources in the region, and each transmission resource identifies one of a plurality of sub-channel frequency ranges and one of a plurality of transmission time-slots. The computer-implemented mapper is further configured to prepare a data record containing the mapping of geographical bins to transmission resources and provide the data record to one or more vehicles that travel down the travel pathway for identifying to the one or more vehicles the transmission resource to use to transmit data.

These aspects and other embodiments may include one or more of the following features. The number of bins in a region may be less than or equal to the number of transmission resources. The computer-implemented mapper may be further configured to map each bin in a region to a different one of the transmission resources. The computer-implemented mapper may be further configured to group the bins into at least a first base region and a second base region wherein the number of bins in each base region is less than or equal to the number of transmission resources and, for each bin in the first base region, there may be a corresponding bin in the second base region that is mapped to the same transmission resource as the bin in the first base region and the corresponding bin in the second base region is spaced several bins away from the bin in the first base region. The number of bins in a region may be greater than the number of transmission resources and the computer-implemented mapper may be further configured to map each bin two bins that are separated by a predetermined distance to the same transmission resource.

In another embodiment, a vehicle is provided. The vehicle comprises a controller configured to receive a data record containing a mapping of geographical bins to transmission resources wherein each transmission resource identifies one of a plurality of sub-channel frequency ranges and one of a plurality of transmission time-slots and wherein each bin is associated with a different geographical area on a travel pathway. The vehicle further comprises a location system configured to identify the geographical bin in which the vehicle is located and a transmitter configured to transmit vehicle data using the transmission resource mapped to the geographical bin in which the vehicle is located.

These aspects and other embodiments may include one or more of the following features. The vehicle may be further configured to receive a signal on a first transmission resource that contains vehicle data from a single vehicle. The vehicle may be further configured to receive a signal on a first transmission resource that contains vehicle data from a plurality of vehicles. The vehicle may further comprise a decoder configured to decode first vehicle data transmitted by a first vehicle from the received signal, subtract the first vehicle estimated received signal from the received signal leaving a first leftover signal, and decode second vehicle data transmitted by a second vehicle from the first leftover signal. The vehicle may be further configured to receive the data record via a communication link from a web server.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. For example, the examples may apply to vehicle-to-infrastructure (V2I), vehicle-to-Pedestrian (V2P), 4G-LTE cellular systems, DSRC, 5G cellular systems, and other systems. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method in a vehicle configured to communicate in a vehicle point-to-multipoint communication system, the method comprising:
    selecting a transmission resource on which to compete for communication rights, each transmission resource identifying one of a plurality of sub-channel frequency ranges and one of a plurality of transmission time-slots;
    competing with one or more vehicles for communication rights on the transmission resource using a listen before talk algorithm, the competing including:
        selecting a random integer value; and
        waiting for a number of transmission free sensing periods equal to the random integer value; and
    transmitting vehicle data on the transmission resource after the conclusion of the transmission free sensing periods equal to the random integer value.

2. The method of claim 1, wherein selecting a transmission resource comprises randomly selecting a transmission resource on which to compete for communication rights.

3. The method of claim 1, wherein selecting a transmission resource comprises randomly selecting a plurality of transmission resources on which to compete for communication rights.

4. The method of claim 3, wherein transmitting vehicle data comprises:
    winning communication rights over at least one of the randomly selected transmission resources; and
    transmitting vehicle data over one of the at least one winning transmission resources.

5. The method of claim 1, wherein:
    selecting a transmission resource comprises selecting a transmission resource that is mapped to the geographical region in which the vehicle is located.

6. The method of claim 1, wherein the random integer value is an integer between one and N, and N is provided by network infrastructure or predefined.

7. The method of claim 1, wherein waiting comprises not counting a sensing period as a transmission free sensing period if a transmission occurred during the sensing period.

8. The method of claim 1, further comprising:
    listening to the transmission resource to determine if the transmission resource is free from transmissions prior to beginning the sensing period; and
    transmitting vehicle data if the transmission resource is free from transmissions prior to beginning the sensing period.

9. The method of claim 1, wherein selecting a transmission resource comprises selecting a plurality of transmission resources that are mapped to the geographical region in which the vehicle is located.

10. A method in a vehicle point-to-multipoint communication system, comprising:
    partitioning a vehicle travel pathway into a plurality of geographical bins, each bin associated with a different geographical area on the travel pathway;
    grouping the bins into one or more regions;
    mapping each bin in a region to a specific sub-channel frequency range and a specific time slot;
    preparing a data record containing the mapping of bins to specific sub-channel frequency range and specific time slot combinations; and
    providing the data record to one or more vehicles that travel down the travel pathway for identifying to the one or more vehicles the specific sub-channel frequency range and specific time slot to use to transmit data.

11. The method of claim 10 wherein the number of bins in a region is less than or equal to the number of specific sub-channel frequency range and specific time slot combinations.

12. The method of claim 11 wherein mapping each bin comprises mapping each bin in a region to a different one of the specific sub-channel frequency range and specific time slot combinations.

13. The method of claim 10 wherein:
    grouping the bins comprises grouping the bins into at least a first base region and a second base region wherein the number of bins in each base region is less than or equal to the number of specific sub-channel frequency range and specific time slot combinations; and
    for each bin in the first base region, there is a corresponding bin in the second base region that is mapped to the same specific sub-channel frequency range and specific time slot as the bin in the first base region and the corresponding bin in the second base region is spaced several bins away from the bin in the first base region.

14. The method of claim 10 wherein the number of bins in a region is greater than the number of specific sub-channel frequency range and specific time slot combinations and mapping each bin comprises mapping two bins that are separated by a predetermined distance to the same specific sub-channel frequency range and specific time slot.

15. A method in a vehicle that communicates in a vehicle point-to-multipoint communication system, comprising:
    receiving, at the vehicle, a data record containing a mapping of geographical bins to a specific sub-channel frequency range and specific transmission time-slot combination, each bin associated with a different geographical area on a travel pathway;
    identifying the geographical bin in which the vehicle is located; and
    transmitting vehicle data using the specific sub-channel frequency range and specific time slot mapped to the geographical bin in which the vehicle is located.

16. The method of claim 15 further comprising receiving a signal on a first specific sub-channel frequency range and specific time slot that contains vehicle data from a single vehicle.

17. The method of claim 15 further comprising receiving a signal on a first specific sub-channel frequency range and specific time slot that contains vehicle data from a plurality of vehicles.

18. The method of claim 17 further comprising:
- decoding first vehicle data transmitted by a first vehicle from the received signal;
- subtracting the first vehicle estimated received signal from the received signal leaving a first leftover signal; and
- decoding second vehicle data transmitted by a second vehicle from the first leftover signal.

19. The method of claim 18 wherein two bins in a region are separated by a predetermined distance and mapped to the same specific sub-channel frequency range and specific time slot.

20. The method of claim 15 wherein receiving a data record comprises receiving a data record via a communication link from a web server.

* * * * *